(12) United States Patent
Dooley et al.

(10) Patent No.: US 9,012,025 B2
(45) Date of Patent: Apr. 21, 2015

(54) FUSER MEMBER

(75) Inventors: Brynn M. Dooley, Toronto (CA); Yu Qi, Oakville (CA); Carolyn P. Moorlag, Mississauga (CA); Qi Zhang, Milton (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 466 days.

(21) Appl. No.: 13/440,314

(22) Filed: Apr. 5, 2012

(65) Prior Publication Data

US 2013/0266803 A1 Oct. 10, 2013

(51) Int. Cl.
| | |
|---|---|
| *B32B 25/04* | (2006.01) |
| *B32B 25/08* | (2006.01) |
| *B32B 25/20* | (2006.01) |
| *B32B 27/08* | (2006.01) |
| *B32B 27/18* | (2006.01) |
| *B32B 27/20* | (2006.01) |
| *B32B 27/26* | (2006.01) |
| *B32B 27/28* | (2006.01) |
| *G03G 15/20* | (2006.01) |
| *C08L 71/00* | (2006.01) |
| *C08L 71/08* | (2006.01) |
| *C08L 83/00* | (2006.01) |
| *C08K 3/00* | (2006.01) |
| *C08K 3/04* | (2006.01) |
| *C08K 3/20* | (2006.01) |
| *B82Y 30/00* | (2011.01) |

(52) U.S. Cl.
CPC .................. *B32B 27/28* (2013.01); *B82Y 30/00* (2013.01); *Y10T 428/269* (2015.01)

(58) Field of Classification Search
None
See application file for complete search history.

(56) References Cited

U.S. PATENT DOCUMENTS

| | | | | |
|---|---|---|---|---|
| 4,281,092 | A * | 7/1981 | Breazeale | 526/247 |
| 6,169,139 | B1 * | 1/2001 | van Cleeff | 524/544 |
| 6,514,650 | B1 * | 2/2003 | Schlueter et al. | 430/56 |
| 8,058,376 | B2 * | 11/2011 | Aten et al. | 526/242 |
| 8,138,274 | B2 * | 3/2012 | Hung et al. | 525/474 |
| 2002/0193500 | A1 * | 12/2002 | Hintzer et al. | 524/546 |
| 2006/0235175 | A1 * | 10/2006 | Baradie et al. | 526/249 |
| 2007/0026222 | A1 * | 2/2007 | Hayakawa et al. | 428/327 |
| 2007/0281165 | A1 * | 12/2007 | Gervasi et al. | 428/421 |
| 2010/0086787 | A1 * | 4/2010 | Qi et al. | 428/421 |
| 2010/0285304 | A1 * | 11/2010 | Wu | 428/323 |
| 2014/0321894 | A1 * | 10/2014 | Qi et al. | 399/333 |

OTHER PUBLICATIONS

Hung et al., "A New Synthetic Approach to Poly- and Perfluorinated Polyethers", American Chemical Society, 1993.

* cited by examiner

*Primary Examiner* — Vivian Chen
(74) *Attorney, Agent, or Firm* — Hoffman Warnick LLC

(57) ABSTRACT

The present teachings disclose a fuser member comprising a substrate, a functional layer disposed on the substrate and an outer layer disposed on the functional layer. The outer layer comprises a cross-linked perfluorinated polyether.

18 Claims, 4 Drawing Sheets

FUSER MEMBER

BACKGROUND

1. Field of Use

This disclosure is generally directed to surface layers having a low surface energy and specifically to fuser members useful in electrophotographic imaging apparatuses, including digital, image on image, and the like.

2. Background

In current xerographic processes, the two types of fuser topcoat materials currently used are fluoroelastomers and fluoroplastics. Fluoroelastomers (e.g. Viton-GF®, a terpolymer of tetrafluoroethylene (TFE), hexafluoropropylene (HFP) and vinylidene fluoride (VF2)) are less easily damaged due their mechanical flexibility and ability to absorb shock energy. Additionally, they can be cross-linked at low curing temperatures and have wide material modification latitude. However, Viton-GF® fusers exhibit an increased surface free energy and require fuser oil to enable toner release which creates end use problems. Fluoroplastics, such as perfluoroalkoxy (PFA), are used for oil-less fusing. Although fluoroplastics exhibit low surface free energy and excellent toner release, fluoroplastics are easily damaged as a result of their mechanical rigidity. Fluoroplastics require high temperature processing conditions which can lead to degradation of the silicone cushioning layer. Fluoroplastics cannot be chemically modified, making tuning of their mechanical properties difficult.

Providing more choices of materials for fuser topcoats is desirable.

SUMMARY

According to an embodiment, there is provided a fuser member comprising a substrate, a functional layer disposed on the substrate, and an outer layer disposed on the functional layer. The outer layer comprises a cross-linked perfluorinated polyether.

According to another embodiment, there is described a fuser member comprising an outer layer disposed on a functional layer wherein the outer layer comprises a cross-linked perfluorinated polyether.

According to another embodiment, there is described a fuser member comprising a substrate, a functional layer disposed on the substrate and an outer layer disposed on the functional layer. The outer layer comprises a cross-linked perfluorinated polyether comprising the formula

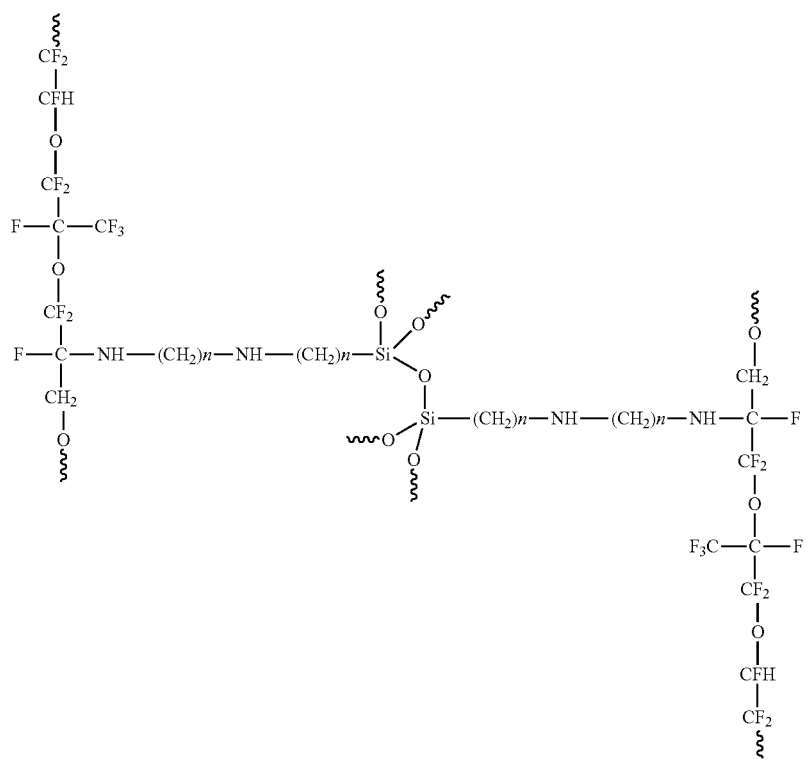

wherein n is a number from about 1 to about 10.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
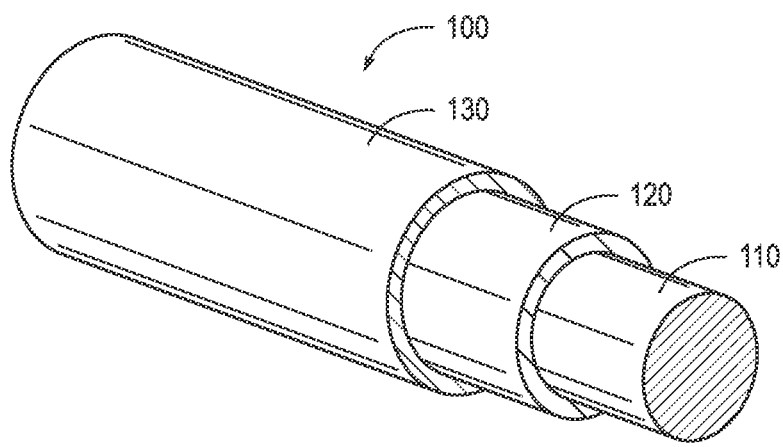
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is surface layer for a fuser member composed of a cross-linked fluorinated polyether. Perfluorinated polyethers exhibit high thermal stability, excellent chemical resistance, and low surface energy.

As used herein, the term "hydrophobic/hydrophobicity" and the term "oleophobic/oleophobicity" refer to the wettability behavior of a surface that has, e.g., a water and hexadecane (or hydrocarbons, silicone oils, etc.) contact angle of approximately 90° or more, respectively. For example, on a hydrophobic/oleophobic surface, a ~10-15 µL water/hexadecane drop can bead up and have an equilibrium contact angle of approximately 90° or greater.

As used herein, the term "ultrahydrophobicity/ultrahydrophobic surface" and the term "ultraoleophobic/ultraoleophobicity" refer to wettability of a surface that has a more restrictive type of hydrophobicity and oleophobicity, respectively. For example, the ultrahydrophobic/ultraoleophobic surface can have a water/hexadecane contact angle of about 120° or greater.

The term "superhydrophobicity/superhydrophobic surface" and the term "superoleophobic/superoleophobicity" refer to wettability of a surface that has an even more restrictive type of hydrophobicity and oleophobicity, respectively. For example, a superhydrophobic/superoleophobic surface can have a water/hexadecane contact angle of approximately 150 degrees or greater and have a ~10-15 µL water/hexadecane drop roll freely on the surface tilted a few degrees from level. The sliding angle of the water/hexadecane drop on a superhydrophobic/superoleophobic surface can be about 10 degrees or less. On a tilted superhydrophobic/superoleophobic surface, since the contact angle of the receding surface is high and since the interface tendency of the uphill side of the drop to stick to the solid surface is low, gravity can overcome the resistance of the drop to slide on the surface. A superhydrophobic/superoleophobic surface can be described as having a very low hysteresis between advancing and receding contact angles (e.g., 40 degrees or less). Note that larger drops can be more affected by gravity and can tend to slide easier, whereas smaller drops can tend to be more likely to remain stationary or in place.

As used herein, the term "low surface energy" and the term "very low surface energy" refer to the ability of molecules to adhere to a surface. The lower the surface energy, the less likely a molecule will adhere to the surface. For example, low surface energy is characterized by a value of about 20 mN/m$^2$ or less; very low surface energy is characterized by a value of about 10 mN/m$^2$ or less.

The fixing or fuser member can include a substrate having one or more functional layers formed thereon. The one or more functional layers includes a surface coating or top layer having a surface wettability that is hydrophobic and/or oleophobic; ultrahydrophobic and/or ultraoleophobic; or superhydrophobic and/or superoleophobic. Such a fixing member can be used as an oil-less fusing member for high speed, high quality electrophotographic printing to ensure and maintain a good toner release from the fused toner image on the supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
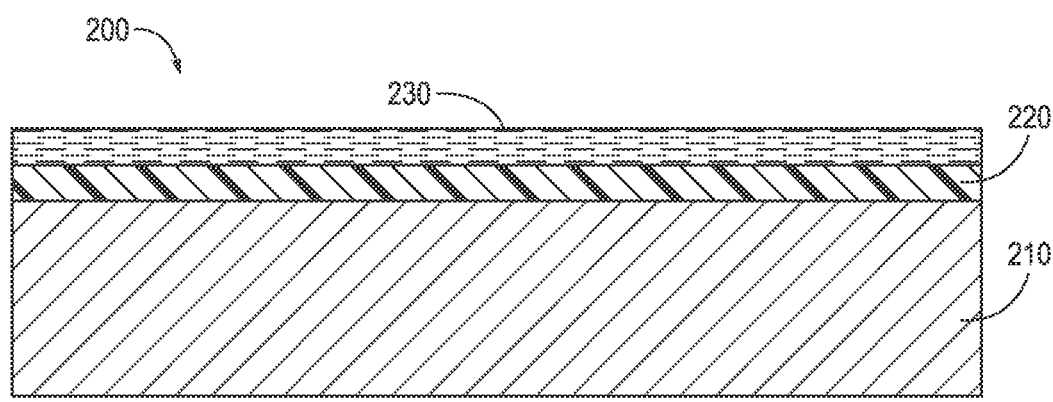
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum or stainless steel) to maintain rigidity and structural integrity, as known to one of ordinary skill in the art.

Substrate Layer

The substrate layer 110, 210 in FIGS. 1 and 2 can be in a form of, for example, a belt, plate, and/or cylindrical drum for the disclosed fuser member. The substrate of the fusing member is not limited, as long as it can provide high strength and physical properties that do not degrade at a fusing temperature. Specifically, the substrate can be made from a metal, such as aluminum or stainless steel or a plastic of a heat-resistant resin. Examples of the heat-resistant resin include a polyimide, an aromatic polyimide, polyether imide, polyphthalamide, polyester, and a liquid crystal material such as a thermotropic liquid crystal polymer and the like. The thickness of the substrate falls within a range where rigidity and flexibility enabling the fusing belt to be repeatedly turned can be compatibly established, for instance, ranging from about 10 micrometers to about 200 micrometers or from about 30 micrometers to about 100 micrometers.

Functional Layer

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl cross-linked heat curable rubbers or silanol room temperature cross-linked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the tecnoflons identified as FOR-60KIR®, FOR-LHF®, NM® FOR-THF®, FOR-TFS® TH® NH®, P757® TNS®, T439® PL958® BR9151® and TN505, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

Adhesive Layer(s)

Optionally, any known and available suitable adhesive layer, also referred to as a primer layer, may be positioned between the release layer 130, 130, the intermediate layer 120, 220 and the substrate 110, 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. Optionally, any known and available suitable adhesive layer may be positioned between the release layer or outer surface, the functional layer and the substrate. The adhesive layer can be coated on the substrate, or on the functional layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Release Layer

An exemplary embodiment of a release layer 130 or 230 includes perfluorinated polyethers. The perfluorinated polyethers provide chemical and thermal stability and have a low surface energy. The perfluorinated polyethers have a decomposition temperature of from about 255° C. to about 360° C. or from about 280° C. to about 330° C.

A method of manufacturing perfluorinated polyethers includes polymerization of a trifluorovinyl ether alcohol via ionic addition of OH groups to a trifluorovinyl ether. Commercially available ester vinyl ether (EVE), available from DuPont, is reduced with sodium borohydride to produce the required trifluorovinyl ether alcohol, EVE-OH. The EVE-OH is polymerized to form the perfluorinated polyether shown below;

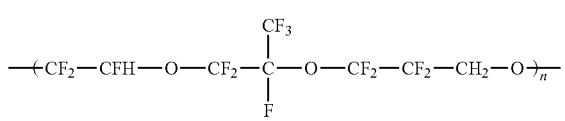

wherein n is from 30 about to about 250, or in embodiment n is from about 40 to about 225, or in embodiments n is from about 50 to about 200.

The resulting perfluorinated polyethers exhibit good solubility in common non-polar and polar aprotic organic solvents. Solvents suitable for dissolving or dispersing perfluorinated polyethers include dimethyl sulfoxide, dimethyl formamide, acetone, tetrahydrofuran, 1,4-dioxane, chloroform, dichloromethane, acetonitrile, methyl isobutyl ketone, cyclohexanone, diethyl ether, ethyl acetate, toluene and benzene. Most high content fluoropolymers are extremely difficult to disperse in organic solvents, making solution-based post-polymerization processing, such as spray or flow-coating, challenging. The solubility of perfluorinated polyethers in common organic solvents is a major processing advantage for the manufacture of fuser topcoats for both fuser rolls and belts.

Catalysts used for the polymerization of EVE-OH include alkali metal carbonates, alkali metal hydrides, alkali metal alkoxides, alkali metal fluorides, phosphonium halides, or tetraalkyl ammonium halides.

In its pure form, perfluorinated polyether is a viscous liquid that requires additional curing to make it suitable for use as a fuser topcoat material. Increasing robustness in fluoropolymers often occurs at the expense of surface free energy and chemical stability. It is challenging to introduce functional groups into the polymer backbone that strengthen the polymer against mechanical wear without increasing surface energy. One commonly employed strategy used to increase toughness and thermal stability is cross-linking which typically results in an increase in modulus, tensile strength, and hardness. The most versatile method of cross-linking involves the use of chemical cross-linking agents which may be quantitatively added post-polymerization, allowing for a large degree of control over mechanical properties of the material, which can be systematically modified by altering the cross-linking density. In embodiments, the perfluorinated polyether is cross-linked with a cross-linking agent known to react with vinylidene fluoride (—CH$_2$CF$_2$—) units, e.g. a siloxane such as AO700, a bisphenol (e.g. BPA type) or an azidosulfonyl type. The terminal alkoxysilane ends then react with each other creating silyl ether linkages between polymer chains.

Suitable cross-linkers include siloxane-containing cross-linkers. The siloxane-containing cross-linkers are selected from the group consisting of Formula I (BPA type) or II (aminosiloxane type) or III (azidosulfonyl type).

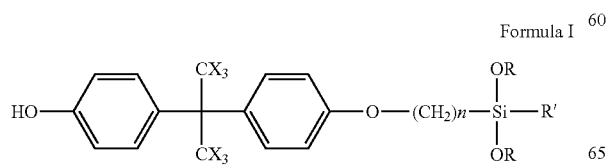

Formula I wherein X is selected from the group consisting of H or F, n is a number from about 1 to about 10, R is an aliphatic chain (linear or branched) having from about 1 carbon atom to about 20 carbon atoms and R' is an aliphatic chain (linear or branched) having from about 1 carbon atom to about 20 carbon atoms;

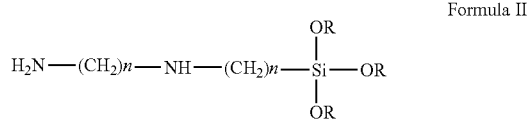

Formula II wherein n is a number from about 1 to about 10 and R is an aliphatic chain (linear or branched) having from about 1 carbon atom to about 20 carbon atoms;

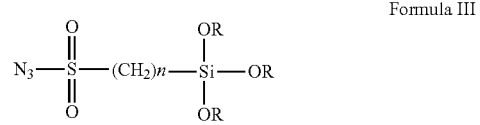

Formula III wherein n is a number from about 1 to about 10 and R is an aliphatic chain (linear or branched) having from about 1 carbon atom to about 20 carbon atoms.

The final polymeric network has mechanical properties similar to fluoroelastomers such as Viton while exhibiting low surface energy. The general structure of the disclosed cross-linked fluorinated polyether topcoat is shown in Formula IV below.

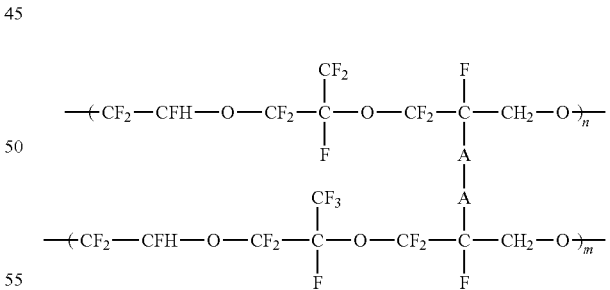

wherein n is from 30 to 250 and m is from 30 to 250 and A comprises an siloxane cross-linker.

Formula IV: Perfluorinated polyether cross-linked with a siloxane cross-linker.

The structure of a perfluorinated polyether cross-linked with an aminosilane type cross-linker is shown below.

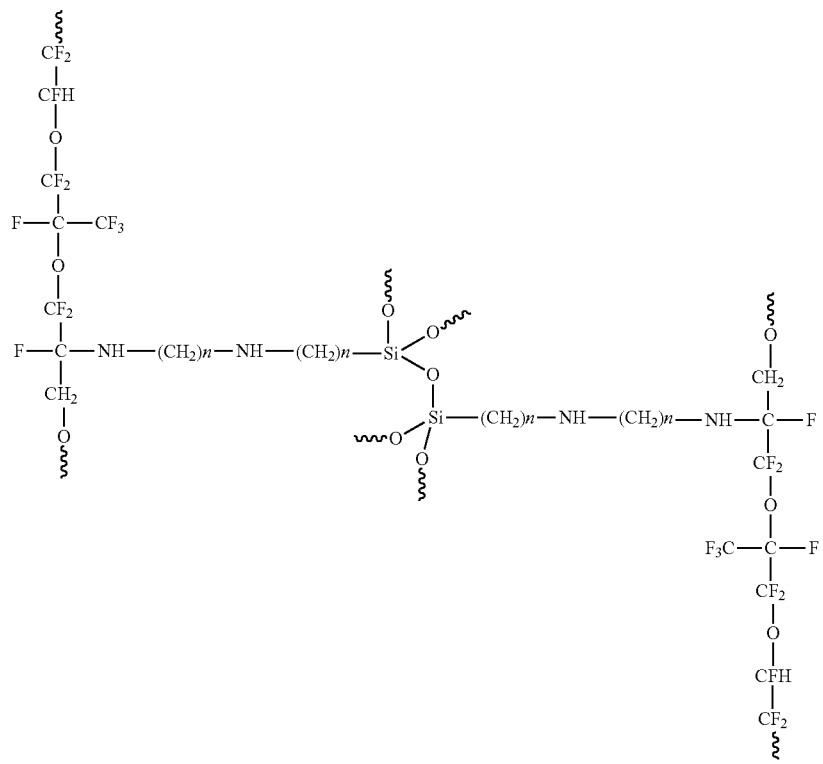

wherein n is a number from about 1 to about 10.

The moderate fluorine of the perfluorinated polyether content results in good release. The fluorinated perfluorinated polyether may have a fluorine content in the range of from about 30 weight percent to about 80 weight percent, specifically from about 45 weight percent to about 70 weight percent, or more specifically from about 55 weight percent to about 65 weight percent.

For the fuser member 200, the thickness of the outer surface layer or release layer 230 can be from about 10 microns to about 100 microns, or from about 20 microns to about 80 microns, or from about 30 microns to about 50 microns.

Additives and additional conductive or non-conductive fillers may be present in the intermediate layer substrate layers 110 and 210, the intermediate layers 120 and 220 and the release layers 130 and 230. In various embodiments, other filler materials or additives including, for example, inorganic particles, such as aerogels can be used for the coating composition and the subsequently formed release layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials. The amount of filler material in the release layer is from about 0 weight percent to about 30 weight percent, or from about 1 weight percent to about 25 weight percent, or from about 2 weight percent to about 10 weight percent of the release layer.

Aerogels may also be included in the release layer. Aerogels are described, in general terms, as gels that have been dried to a solid phase by removing pore fluid and replacing the pore fluid with air. As used herein, an "aerogel" refers to a material that is generally a very low density ceramic solid, typically formed from a gel. The term "aerogel" is thus used to indicate gels that have been dried so that the gel shrinks little during drying, preserving its porosity and related characteristics. In contrast, "hydrogel" is used to describe wet gels in which pore fluids are aqueous fluids. The term "pore fluid" describes fluid contained within pore structures during formation of the pore element(s). Upon drying, such as by supercritical drying, aerogel particles are formed that contain a significant amount of air, resulting in a low density solid and a high surface area. In various embodiments, aerogels are thus low-density microcellular materials characterized by low mass densities, large specific surface areas and very high porosities. In particular, aerogels are characterized by their unique structures that comprise a large number of small interconnected pores. After the solvent is removed, the polymerized material is pyrolyzed in an inert atmosphere to form the aerogel.

Any suitable aerogel component can be used. In embodiments, the aerogel component can be, for example, selected from inorganic aerogels, organic aerogels, carbon aerogels, and mixtures thereof. In particular embodiments, ceramic aerogels can be suitably used. These aerogels are typically composed of silica, but may also be composed of metal oxides, such as alumina, titania and zirconia, or carbon, and can optionally be doped with other elements such as a metal.

In some embodiments, the aerogel component can comprise aerogels chosen from polymeric aerogels, colloidal aerogels, and mixtures thereof.

For the fuser member 200, the thickness of the outer surface layer or release layer 230 can be from about 10 microns to about 100 microns, or from about 20 microns to about 80 microns, or from about 30 microns to about 50 microns.

Figure 3A:
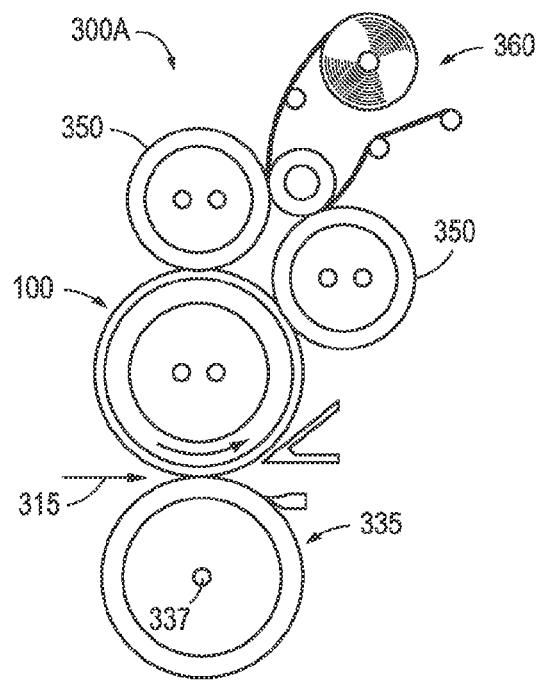
FIGS. 3A-3B depict exemplary fusing configurations using the fuser rollers shown in FIG. 1 in accordance with the present teachings.
Figure 3B:
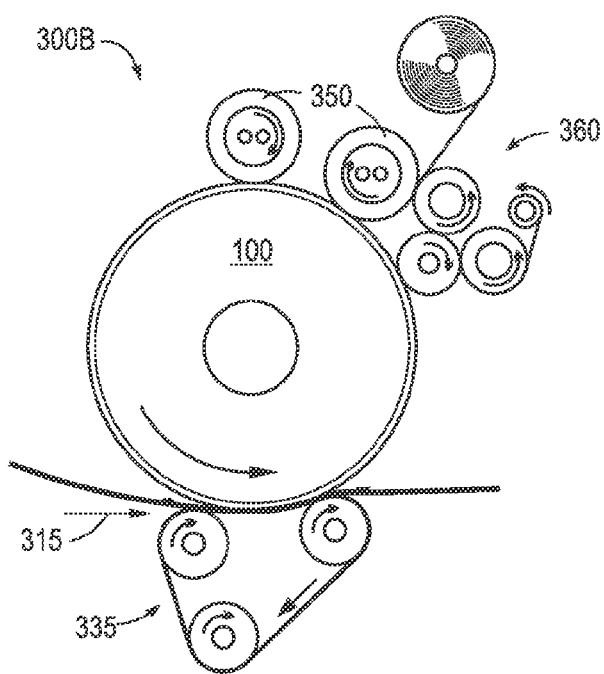
Figure 4A:
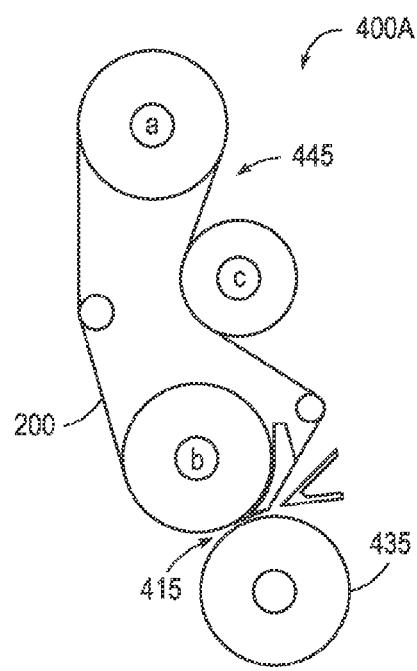
FIGS. 4A-4B depict another exemplary fusing configurations using the fuser belt shown in FIG. 2 in accordance with the present teachings.
Figure 4B:
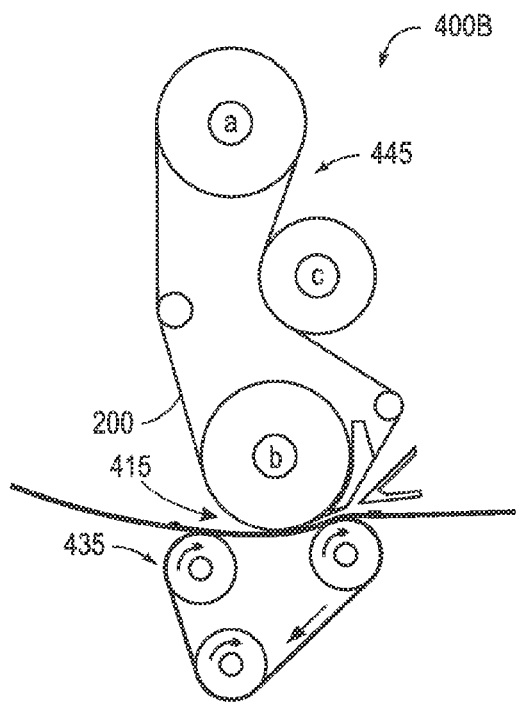

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
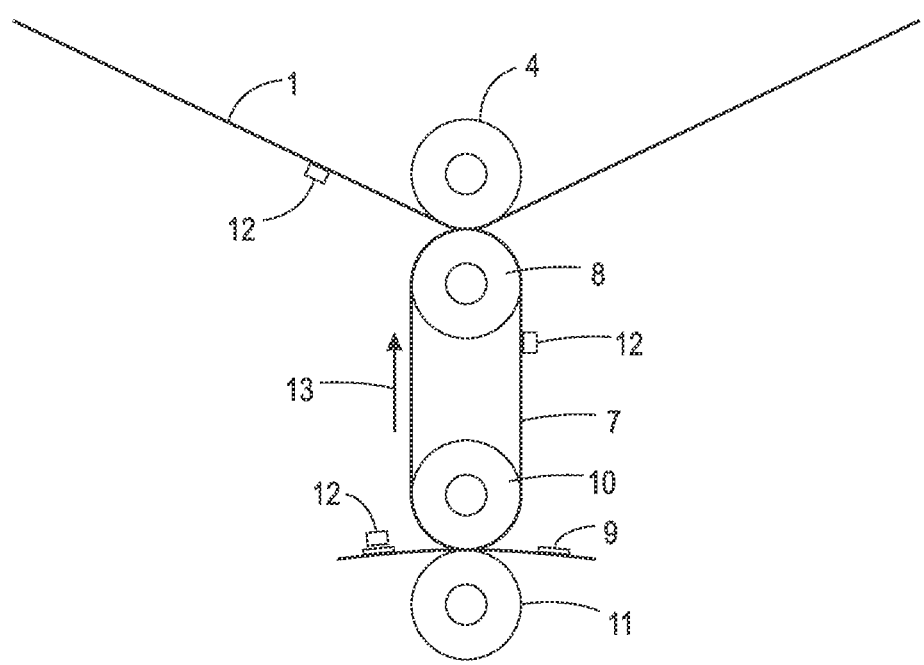
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

The perfluorinated polyether release layer has a surface free energy that is less than about 30 mN/m$^2$. In embodiments the surface free energy is less than about 25 mN/m$^2$ for a superhydrophobic surface, or between about 30 mN/m$^2$ and about 5 mN/m$^2$, or is between about 25 mN/m$^2$ and about 7 mN/m$^2$, or is between 22 about mN/m$^2$ and about 10 mN/m$^2$.

The perfluorinated polyether release layer is commonly processed by dissolving or dispersing the perfluorinated polyether in a solvent. The solvent containing the perfluorinated polyether is coated on a substrate and dried. Possible coating methods include spray coating dip coating or bar coating.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Preparation of Cross-Linked Perfluorinated Polyether Coating

Perfluorinated polyether was dissolved in methyl isobutyl ketone to give a 40 weight percent polymer solution. The solution was roll mixed for about 20 minutes at which point it became homogeneous. Five parts per hundred of A0700 curing agent (N-(2-aminoethyl)-3-aminopropyltrimethoxysilane, available from Gelest Inc.) were added to the 40 weight percent polymer solution. The solution was roll mixed for about 16 hours. The resulting coating dispersion was then coated onto a suitable (e.g. aluminum paper or metalized Mylar) substrate by either draw, flow or spray coating. Most of the solvent was allowed to evaporate from the coating, followed by curing at ramp temperatures, e.g., at about 149° C. for about 2 hours, and at about 177° C. for about 2 hours, then at about 204° C. for about 2 hours, and then at about 232° C. for about 6 hours for a post cure.

Example 2

Preparation of Cross-Linked Perfluorinated Polyether Coating

Perfluorinated polyether was dissolved in methyl isobutyl ketone to give a 40 weight percent polymer solution. The solution was roll mixed for about 20 minutes at which point it became homogeneous. Five parts per hundred of 6-azidosulfonylhexyl triethoxysilane curing agent (available from Gelest Inc.) were added to the 40 weight percent polymer solution. The solution was roll mixed for about 16 hours. The resulting coating dispersion was then coated onto a suitable (e.g. aluminum paper or metalized Mylar) substrate by either draw, flow or spray coating. Most of the solvent was allowed to evaporate from the coating, followed by curing at ramp temperatures, e.g., at about 149° C. for about 2 hours, and at about 177° C. for about 2 hours, then at about 204° C. for about 2 hours, and then at about 232° C. for about 6 hours for a post cure.

Example 3

Preparation of Fuser Member

Perfluorinated polyether was dissolved in methyl isobutyl ketone to give a 40 weight percent polymer solution. The solution was roll mixed for about 20 minutes at which point it became homogeneous. Five part per hundred of A0700 curing agent (N-(2-aminoethyl)-3-aminopropyltrimethoxysilane, available from Gelest Inc.) were added to the 40 weight percent polymer solution. The solution was roll mixed for about 16 hours. The resulting coating dispersion was then coated onto a cylindrical silicone rubber fuser roll substrate by spray coating. Most of the solvent was allowed to evaporate from the coating, followed by curing at ramp temperatures, e.g., at about 149° C. for about 2 hours, and at about 177° C. for about 2 hours, then at about 204° C. for about 2 hours, and then at about 232° C. for about 6 hours for a post cure.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate;
   a functional layer disposed on the substrate; and
   an outer layer disposed on the functional layer wherein the outer layer comprises a cross-linked perfluorinated polyether represented by:

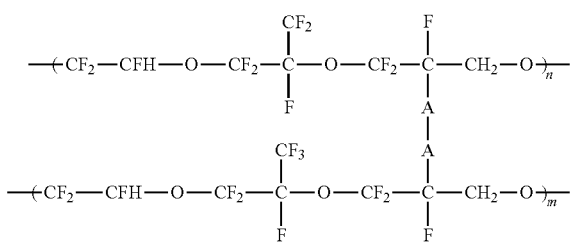

wherein n is from 30 to 250, m is from 30 to 250 and A comprises an siloxane-containing cross-linker.

2. The fuser member of claim 1, wherein the siloxane-containing cross-linkers is selected from the group consisting of Formula I;

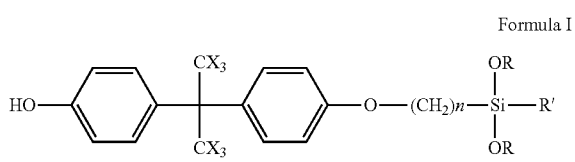

wherein X is selected from the group consisting of H or F, n is a number from about 1 to about 10, R is an aliphatic chain (linear or branched) having from about 1 carbon atom to about 20 carbon atoms and R' is an aliphatic chain (linear or branched) having from about 1 carbon atom to about 20 carbon atoms; Formula II

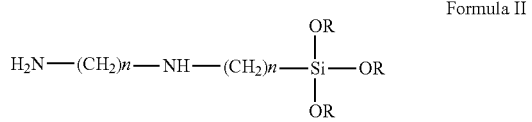

wherein n is a number from about 1 to about 10 and R is an aliphatic chain (linear or branched) having from about 1 carbon atom to about 20 carbon atoms; and Formula III

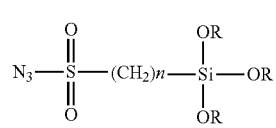

wherein n is a number from about 1 to about 10 and R is an aliphatic chain (linear or branched) having from about 1 carbon atom to about 20 carbon atoms.

3. The fuser member of claim 1, wherein the outer layer further comprises filler materials selected from the group consisting carbon black, graphite, aerogels, fullerene, acetylene black, fluorinated carbon black, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixture thereof.

4. The fuser member of claim 3, wherein the filler materials about comprise from 0 weight percent to about 30 weight percent of the outer layer.

5. The fuser member of claim 1, wherein the outer layer comprises a thickness of from about 10 microns to about 250 microns.

6. A fuser member comprising:
   an outer layer disposed on the functional layer wherein the outer layer comprises a cross-linked perfluorinated polyether represented by:

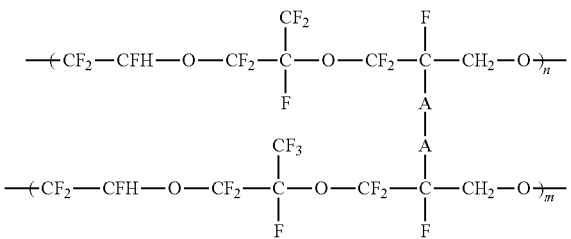

wherein n is from 30 to 250, m is from 30 to 250 and A comprises an siloxane-containing cross-linker.

7. The fuser member of claim 6, wherein the siloxane-containing cross-linkers is selected from the group consisting of Formula I;

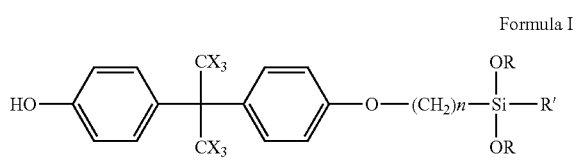

wherein X is selected from the group consisting of H or F, n is a number from about 1 to about 10, R is an aliphatic chain (linear or branched) having from about 1 carbon atom to about 20 carbon atoms and R' is an aliphatic chain (linear or branched) having from about 1 carbon atom to about 20 carbon atoms; Formula II

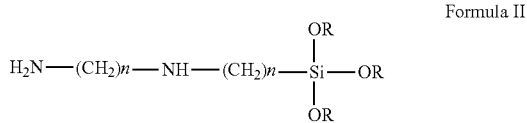

Formula II wherein n is a number from about 1 to about 10 and R is an aliphatic chain (linear or branched) having from about 1 carbon atom to about 20 carbon atoms; and Formula III

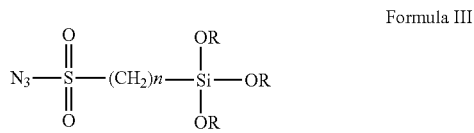

Formula III wherein n is a number from about 1 to about 10 and R is an aliphatic chain (linear or branched) having from about 1 carbon atom to about 20 carbon atoms.

8. The fuser member of claim 6 further comprising:
a substrate; and
a resilient layer disposed on the substrate wherein the outer layer is disposed on the resilient layer.

9. The fuser member of claim 8, wherein the resilient layer comprises a silicone material.

10. The fuser member of claim 8, wherein the substrate comprises a metal.

11. The fuser member of claim 6, wherein the outer layer further comprises filler materials selected from the group consisting carbon black, graphite, aerogels, fullerene, acetylene black, fluorinated carbon black, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof.

12. The fuser member of claim 11, wherein the filler materials comprise from about 0 weight percent to about 30 weight percent of the outer layer.

13. The fuser member of claim 6, wherein the outer layer comprises a thickness of from about 10 microns to about 250 microns.

14. The fuser member of claim 6 comprising a roller.

15. The fuser member of claim 6 comprising a belt.

16. A fuser member comprising:
a substrate;
a functional layer disposed on the substrate; and
an outer layer disposed on the functional layer wherein the outer layer comprises a cross-linked perfluorinated polyether comprising the formula

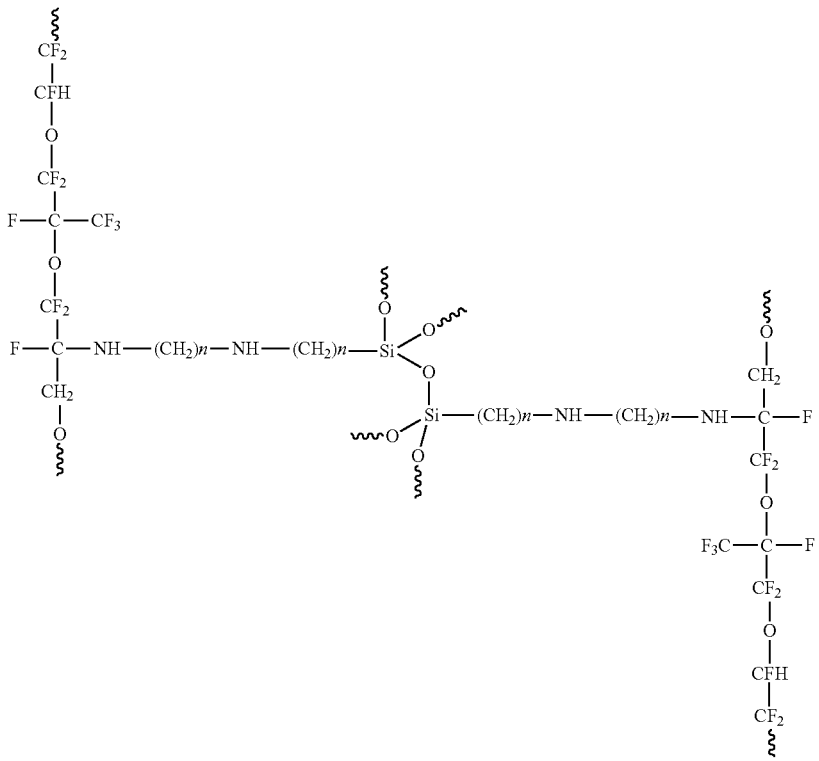

wherein n is a number from about 1 to about 10.

17. The fuser member of claim 16, wherein the outer layer comprises a thickness of from about 10 microns to about 250 microns.

18. The fuser member of claim 17 comprising a roller.

* * * * *